(12) United States Patent
Kang (10) Patent No.: US 11,163,438 B2
(45) Date of Patent: Nov. 2, 2021

(54) METHOD AND APPARATUS FOR ADJUSTING OUTPUTS OF ELECTRONIC DEVICE BY USING TOUCH TECHNOLOGY

(71) Applicant: Tae Ho Kang, Seongnam-si (KR)

(72) Inventor: Tae Ho Kang, Seongnam-si (KR)

( * ) Notice: Subject to any disclaimer, the term of this patent is extended or adjusted under 35 U.S.C. 154(b) by 58 days.

(21) Appl. No.: 16/642,874

(22) PCT Filed: Oct. 13, 2017

(86) PCT No.: PCT/KR2017/011338
§ 371 (c)(1),
(2) Date: Feb. 27, 2020

(87) PCT Pub. No.: WO2019/045168
PCT Pub. Date: Mar. 7, 2019

(65) Prior Publication Data
US 2020/0348837 A1 Nov. 5, 2020

(30) Foreign Application Priority Data
Aug. 29, 2017 (KR) .......................... 10-2017-0109118

(51) Int. Cl.
*G06F 3/0488* (2013.01)
*G06F 3/041* (2006.01)
*G06F 3/0484* (2013.01)

(52) U.S. Cl.
CPC ...... *G06F 3/04883* (2013.01); *G06F 3/04162* (2019.05); *G06F 3/04186* (2019.05); *G06F 3/04845* (2013.01)

(58) Field of Classification Search
CPC ............. G06F 3/04883; G06F 3/04162; G06F 3/04186; G06F 3/04845
See application file for complete search history.

(56) References Cited

U.S. PATENT DOCUMENTS

| 9,454,277 B2 | 9/2016 | Hotelling et al. |
| 2012/0030619 A1 | 2/2012 | Lee et al. |
| 2015/0277745 A1* | 10/2015 | Qian ................... G06F 16/5854 715/863 |

FOREIGN PATENT DOCUMENTS

| JP | 10-2012-0012115 A | 2/2012 |
| JP | 10-2017-0069773 A | 6/2017 |

(Continued)

OTHER PUBLICATIONS

KR Notification of Reason for Refusal dated Oct. 23, 2018 as received in Application No. 10-2017-0109118.

(Continued)

*Primary Examiner* — Priyank J Shah
(74) *Attorney, Agent, or Firm* — Maschoff Brennan (57) ABSTRACT

Disclosed are a method and an apparatus for adjusting outputs of an electronic device by using a touch technology. The apparatus for adjusting outputs of the electronic device, according to an embodiment of the present invention, comprises: a touch input unit for sensing a touch input of a first figure and at least one second figure; and an output adjustment unit for generating at least one piece of adjustment information for adjusting at least one output of the electronic device according to a relative phase relationship (topology) of the first figure and the at least one second figure, and adjusting the at least one output of the electronic device. The output adjustment unit can generate the at least one piece of adjustment information when the relative phase relationship between the at least one first figure and the at least one second figure is the same even if the touch position and direction on the touch input unit are different.

16 Claims, 5 Drawing Sheets

(56) References Cited

FOREIGN PATENT DOCUMENTS

| KR | 10-2011-0003385 A | 1/2011 |
| KR | 10-2011-0029058 A | 3/2011 |
| KR | 10-2012-0082320 A | 7/2012 |
| KR | 10-2014-0067541 A | 6/2014 |
| KR | 10-2017-0087789 A | 7/2017 |

OTHER PUBLICATIONS

KR Grant of Patent dated Aug. 9, 2019 as received in Application No. 10-2017-0109118.

* cited by examiner

METHOD AND APPARATUS FOR ADJUSTING OUTPUTS OF ELECTRONIC DEVICE BY USING TOUCH TECHNOLOGY

TECHNICAL FIELD

The present invention relates to a method and an apparatus for adjusting outputs of an electronic device by using touch technology, and more particularly, to a technology for adjusting outputs of an electronic device through an intuitive touch input of a user.

BACKGROUND ART

There are various electronic devices, such as TVs, smart phones, smart bands, air conditioners, refrigerators, fans, and heaters, to facilitate a real life.

It is inconvenient that the user is required to learn different adjustment skills for each electronic device to adjust the outputs of the various electronic devices, such as a channel change of the TV, a volume of the smart phone, a refrigeration temperature of the refrigerator, and a wind strength of the fan, in addition to the power On/Off of the TV, smart phone, refrigerator, fan, or the like.

DETAILED DESCRIPTION OF THE INVENTION

Technical Problem

A method and an apparatus for adjusting outputs of an electronic device through an intuitive touch input of a user are proposed.

Technical problems of the present invention are not limited to the above-mentioned technical problems, and other problems that are not mentioned herein may be apparently understood by those skilled in the art based on the following descriptions.

TECHNICAL SOLUTION

The method for adjusting outputs of an electronic device using touch technology depending on one aspect of the present invention includes: detecting touch inputs of at least one first figure and at least one second figure from a touch input unit; and adjusting, in an output adjustment unit, at least one output of the electronic device by generating at least one adjustment information configured to adjust at least one output of the electronic device depending on a relative topology between the at least one first figure and the at least one second figure.

The output adjustment unit may generate the at least one adjustment information when the at least one first figure and the at least one second figure have a same relative topology therebetween even if a position and a direction of a touch on the touch input unit are different.

The output adjustment unit may generate the at least one adjustment information by taking into consideration at least one of an association attribute between the at least one first figure and the at least one second figure depending on the relative topology and an intrinsic attribute of the at least one second figure in addition to the relative topology.

The method may further include detecting, from the touch input unit, an input of predictive information that informs touch inputs of at least one first figure and at least one second figure in advance for generating the at least one adjustment information, before the touch inputs of the at least one first figure and the at least one second figure.

In the step of adjusting the at least one output of the electronic device, the output adjustment unit may generate at least one adjustment information for adjusting at least one output of the electronic device depending on a relative topology between the at least one first figure and the at least one second figure touch-inputted from the touch input unit, after the input of the predictive information is detected.

The method for adjusting outputs of an electronic device using a touch technology depending on another aspect of the invention includes: detecting a touch input of a line by the touch input unit; detecting, by the touch input unit, a touch input of a dragged line intersecting the line over the line or dragged in a region other than the line; and adjusting, in an output adjustment unit, the output of the electronic device in real time by generating adjustment information for adjusting the output of the electronic device depending on a relative topology between the line and the dragged line, and a length of the dragged line and a dragged direction.

The output adjustment unit may generate the adjustment information when the relative topology between the line and the dragged line and the length of the dragged line and the dragged direction are the same even if the position and the direction of the touch on the touch input unit are different.

The method may further include detecting, by the touch input unit, an input of predictive information that informs touch inputs of a line and a dragged line in advance for generating the adjustment information, before the touch input of the line and the dragged line.

In the step of adjusting the output of the electronic device, the output adjustment unit may generate adjustment information for adjusting the output of the electronic device depending on the relative topology between the line and the dragged line touch-inputted from the touch input unit, and a length of the dragged line and a dragged direction, after the input of the predictive information is detected.

The method for adjusting outputs of an electronic device using a touch technology depending on still another aspect of the invention includes: detecting touch inputs of a line and at least one point by the touch input unit; and adjusting, in an output adjustment unit, at least one output of the electronic device by generating at least one adjustment information configured to adjust at least one output of the electronic device depending on the relative topology between the line and the at least one point.

The output adjustment unit may generate the at least one adjustment information when the relative topology between the line and the at least one point is the same even if a position and a direction of a touch on the touch input unit are different.

The output adjustment unit may generate the at least one adjustment information by taking into consideration at least one of an intrinsic attribute of the at least one point and an associated attribute between the line and the at least one point depending on the relative topology, in addition to the relative topology.

With regard to the relative topology, all of the at least one point may be positioned at the same or different position on the line, or a part of the at least one point may be positioned at the same or different position on the line and the remaining may be positioned at a position other than the line.

When the at least one point is positioned at the same position on the line, the association attribute may be the ratio between a spaced distance between the start point of the line and the same position or a spaced distance between the end point of the line and the same position and a length of the line.

When the at least one point is positioned at a different position on the line, the association attribute may be the ratio between a spaced distance between the start point of the line and any one of the at least one point positioned at the different positions or a spaced distance between the end point of the line and any one of the at least one point positioned at the different positions and a length of the line.

When the at least one point is positioned in a region of the touch input unit other than the line, the association attribute may be the ratio between a spaced distance between any one of the at least one point positioned in the region of the touch input unit other than the line and the line, and a length of the line.

The intrinsic attribute of the point may be a touch duration or touch area of the point.

The method may further include detecting, by the touch input unit, an input of predictive information that informs touch inputs of a line and at least one point in advance for generating the adjustment information, before the touch inputs of the line and the at least one point.

In the step of adjusting the output of the electronic device, the output adjustment unit may generate at least one adjustment information for adjusting at least one output of the electronic device depending on the relative topology between the line and the at least one point touch-inputted from the touch input unit, after the input of the predictive information is detected.

The apparatus for adjusting outputs of the electronic device using a touch technology depending on still another aspect of the invention includes: a touch input unit configured to detect touch inputs of a first figure and at least one second figure; and an output adjustment unit configured to adjust at least one output of the electronic device by generating at least one adjustment information configured to adjust at least one output of the electronic device depending on a relative topology of the first figure and the at least one second figure.

The output adjustment unit may generate the at least one adjustment information when the first figure and the at least one second figure have a same relative topology therebetween even if a position and a direction of a touch on the touch input unit are different.

The output adjustment unit may generate the at least one adjustment information by taking into consideration at least one of an association attribute between the first figure and the at least one second figure depending on the relative topology, and an intrinsic attribute of the at least one second figure, in addition to the relative topology.

The touch input unit may detect an input of predictive information that informs touch inputs of a first figure and at least one second figure in advance for generating the at least one adjustment information by the touch input unit, before the touch input of the first figure and the at least one second figure.

The output adjustment unit may generate at least one adjustment information for adjusting at least one output of the electronic device depending on a relative topology between the first figure and the at least one second figure touch-inputted from the touch input unit, after the input of the predictive information is detected.

Advantageous Effects of the Invention

According to the method and the apparatus for adjusting outputs of the electronic device using the touch technology based on the embodiments of the present invention, the user can adjust outputs of the electronic device through the intuitive touch input.

BEST MODE

Hereinafter, exemplary embodiments of the present invention will be described in detail with reference to the accompanying drawings.

The embodiments of the present invention are provided to more completely describe the invention to those having ordinary skills in the art. The following embodiments may be modified in various different forms, and the scope of the present invention is not limited to the embodiments described below. On the contrary, the embodiments are provided to further enhance and complete the present disclosure and fully deliver the spirit of the present invention to those skilled in the art.

The terms herein are used for the purpose of describing specific embodiments and are not intended to limit the invention. As used herein singular forms may include plural forms unless the context clearly indicates otherwise. In addition, as used herein, "comprise" and/or "comprising" may specify the presence of mentioned shapes, numbers, steps, operations, members, elements and/or groups thereof, and it is not intended to exclude the presence or addition of one or more other shapes, numbers, operations, members, elements and/or groups thereof. As used herein, the term "and/or" includes any one or all combinations of the listed items.

Although the terms such as first and second are used herein to describe various members, regions, and/or portions, it is obvious that the members, components, regions, layers and/or portions shall not be limited by those terms. Those terms do not imply any particular order, priority or superiority, and are used only to distinguish one member, region or portion from another member, region or portion. Accordingly, the first member, region or portion to be described below may refer to the second member, region or portion without departing from the teachings of the present invention.

Hereinafter, the embodiments of the present invention will be described with reference to the drawings that schematically illustrate the embodiments of the present invention. In the drawings, deformations of the depicted shapes may be anticipated depending on manufacturing technique and/or tolerances, for example. Accordingly, the embodiments of the invention should not be construed as limited to the specific shapes of the regions depicted herein. For example, it shall include a change in shape that results from manufacturing.

Figure 1:
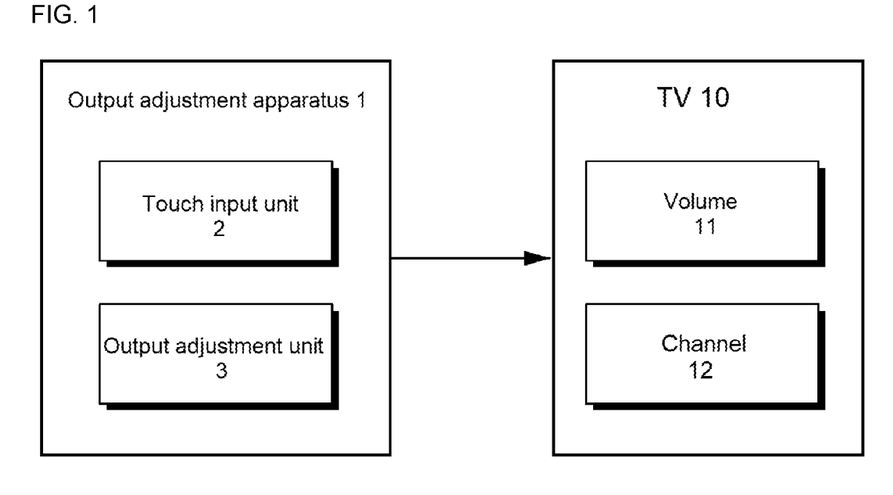
FIG. 1 is a block diagram of an apparatus of adjusting an output of an electronic device using a touch technology depending on an embodiment of the present invention.

FIG. 1 is a block diagram of an apparatus of adjusting an output of an electronic device using a touch technology depending on an embodiment of the present invention.

Referring to FIG. 1, the output adjustment apparatus 1 of an electronic device using a touch technology depending on the embodiments of the present invention may be implemented as an electronic device 10 such as an electronic apparatus separated from a TV or may be implemented as a component inside the electronic device 10. An embodiment of the output adjustment apparatus 1 implemented as the electronic apparatus separate from the electronic device 10 may include a smart band wearable on a wrist, a smart phone, a remote controller, a laptop, and the like, and is not limited thereto.

In addition, although FIG. 1 illustrates the TV as the embodiment of the electronic device 10, it is not limited thereto. Any electronic device capable of communicating with the output adjustment apparatus 1 and capable of receiving adjustment information transmitted from the output adjustment apparatus 1 and controlling each output may be available. In addition to the TV, the electronic device 10 may include a refrigerator, a heater, a fan, an air conditioner, an MP3 player, a lamp, or the like.

Accordingly the output of the electronic device 10 is adjusted depending on the adjustment information received from the output adjustment apparatus 1, and the output of the electronic device 10 may vary depending on a type of the electronic device 10.

For example, when the electronic device 10 is a TV, the output of the electronic device 10 may be at least one of a volume and a channel change. In addition, when the electronic device 10 is an air conditioner, the output of the electronic device 10 may be cooling strength of the air conditioner. In addition, when the electronic device 10 is a fan, the output of the electronic device 10 may be wind strength of the fan. In addition, when the electronic device 10 is a lamp, the output of the electronic device 10 may be illuminance of the lamp.

In other words, the output adjustment apparatus 1 depending on the embodiments of the present invention may adjust the output of the electronic device 10 by generating adjustment information for adjusting the output of the electronic device 10, depending on the relative topology between the line and the point that are touch-inputted or the relative topology between the line and another line.

The configuration of the output adjustment apparatus 1 will be described.

The output adjustment apparatus 1 depending on the embodiments of the present invention includes a touch input unit 2 and an output adjustment unit 3.

The touch input unit 2 detects touch inputs of at least one first figure and at least one second figure.

The touch input unit 2 may be a touch pad, a touch panel, or a touch screen manufactured by attaching a touch panel onto the monitor screen. Further, the touch input unit 2 may be manufactured by attaching the touch panel on to an outer surface of a housing of an electronic apparatus, which is not display information, unlike a monitor screen, for example, onto a housing of a remote controller that is not provided thereon with a button.

In other words, the touch input unit 2 may be manufactured by attaching the touch panel onto an electronic apparatus to which the touch panel is attachable.

The output adjustment unit 3 adjusts at least one output of the electronic device 10 by generating at least one adjustment information for adjusting at least one output of the electronic device 10, depending on a relative topology between the at least one first figure and the at least one second figure.

The touch input unit 2 and the output adjusting unit 3 may be separately embodied or implemented from each other in the output adjustment apparatus 1. According to one embodiment, the touch input unit 2 may implemented in a smart band, and the output adjustment unit 3 may be implemented in a smart phone, so that the electronic device may be remotely controlled. In this case, when touch information inputted through the touch input unit 2 implemented in the smart band is transmitted to the smart phone, the output adjustment unit 3 implemented in the smart phone may interpret the touch information and generate adjustment information for adjusting an output of the electronic device.

Hereinafter, in the case that the electronic device 10 is a TV for example, the process of adjusting an output of a TV by generating at least one adjustment information will be described. In addition, it is assumed that adjustment information generated when the electronic device 10 is the TV includes at least one of a volume control and a channel change.

Figure 2:
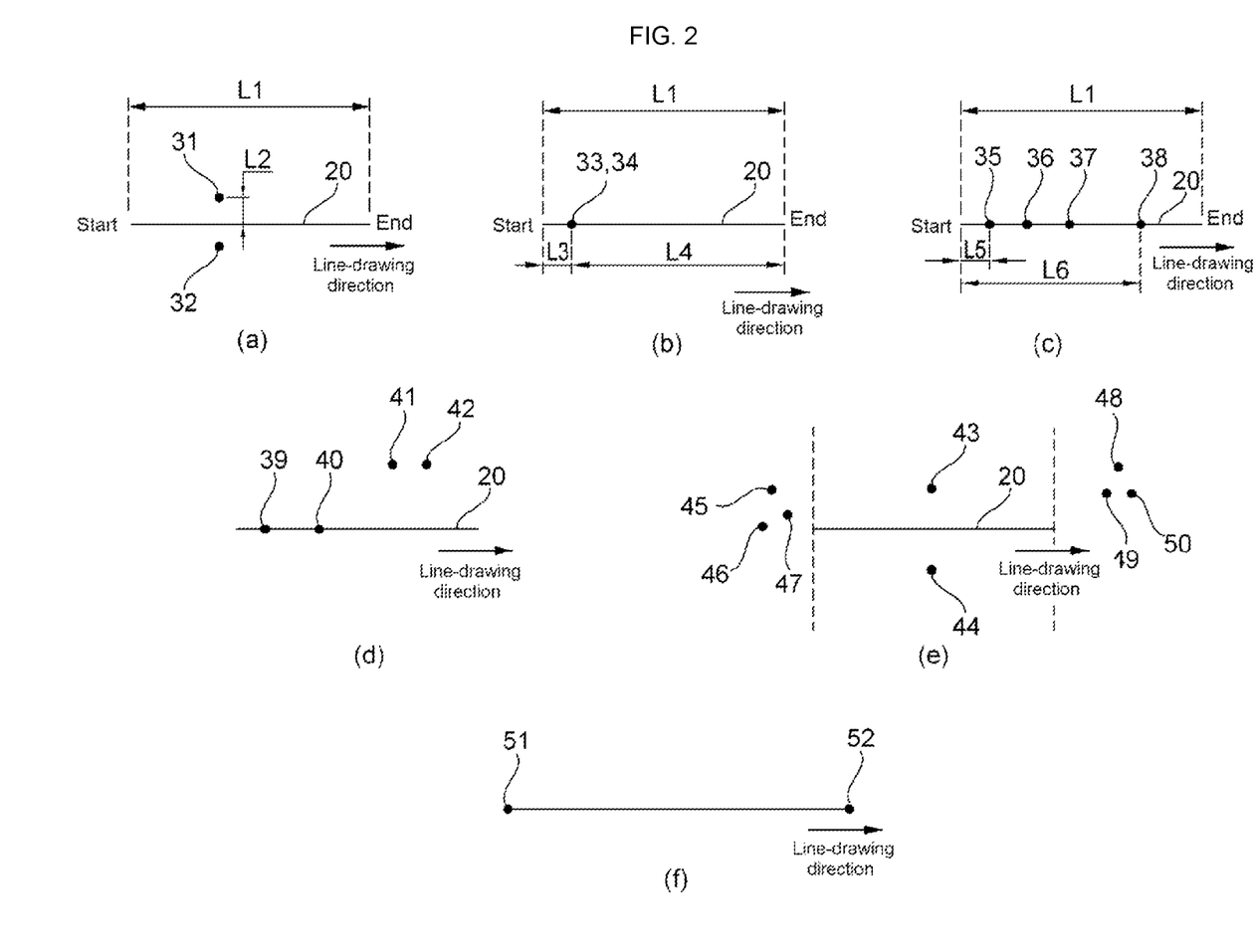
FIG. 2 is a view illustrating a relative topology between a line and a point.
Figure 3:
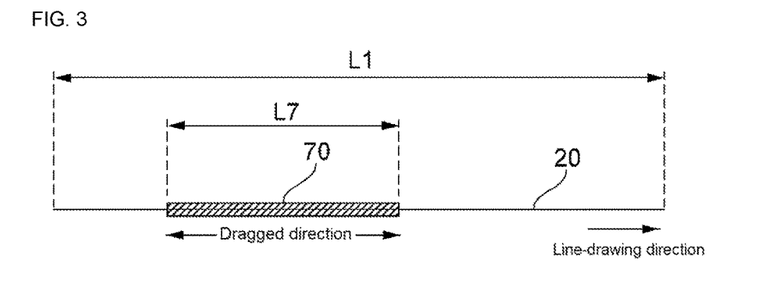
FIG. 3 is a view illustrating a relative topology between a line and a dragged line.
Figure 4:
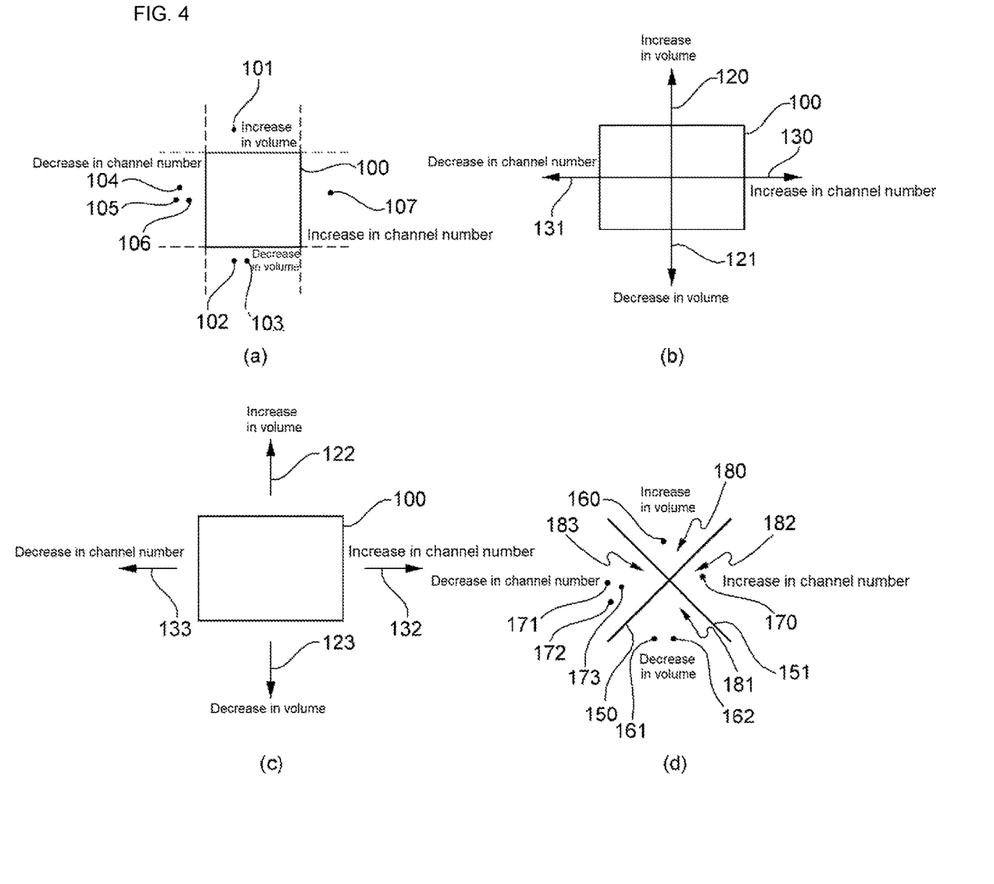
FIG. 4 is a view illustrating a relative topology between at least one first figure and at least one second figure.

FIGS. 2 to 4 show examples of the relative topology between the at least one first figure and the at least one second figure.

According to the present invention, a figure may be used as a shape expressed as a point or a set of points. The shape includes a line, a circle, or a polygon such as a triangle and a square.

FIG. 2 is a view illustrating a relative topology between a line and a point.

FIG. 2(a) illustrates the case in which the line 20 is inputted to the touch input unit 2 in a drawing direction and then one point 31 is inputted to a left side of the drawing direction of the line 20 in the touch input unit 2 or one point 32 is inputted to a right side of the drawing direction of the line 20 in the touch input unit 2.

When the one point 31 is touched at the left side of the drawing direction of the line 20 after the line 20 is inputted, the output adjustment unit 3 may control a volume increase of the electronic device 10 by generating adjustment information configured to increase a volume of the electronic device 10 by one step equivalent to a preset volume.

Meanwhile, when the one point 32 is touched at the right side of the drawing direction of the line 20 after the line 20 is inputted, the output adjustment unit 3 may control a volume decrease of the electronic device 10 by generating adjustment information configured to decrease the volume of the electronic device 10 by one step equivalent to the preset volume.

FIG. 2(b) illustrates the case in which the line 20 is inputted to the touch input unit 2 in a drawing direction and then two points 33 and 34 are touched at the same position on the line 20.

When the two points 33 and 34 are inputted at the same position on the line 20 within a predetermined distance from a start point of the line 20 after the line 20 is inputted, the output adjustment unit 3 may control a volume decrease of the electronic device 10 by generating adjustment information configured to decrease the volume of the electronic device 10 by two steps equivalent to the preset volume. Meanwhile, when at least one point is inputted at the same position on the line 20 within a predetermined distance from an end point of the line 20, the output adjustment unit 3 may control the volume increase of the electronic device 10.

FIG. 2(c) illustrates the case in which the line 20 is inputted to the touch input unit 2 in a drawing direction and then four points 35, 36, 37, 38, and 39 are touched at different positions on the line 20, respectively.

FIG. 2(d) illustrates the case in which the line 20 is inputted to the touch input unit 2 in a drawing direction and then the two points 39 and 40 are touch-inputted at different positions on the line 20, and the two points 41 and 42 are touch-inputted on the left side of the drawing direction of the line 20.

FIG. 2(e) illustrates the case in which the line 20 is inputted to the touch input unit 2 in a drawing direction and one point 43 is inputted to the left side of the drawing direction of the line 20 in the touch input unit 2 or one point 44 is inputted to the right side of the drawing direction of the line 20 in the touch input unit 2, and then three points 45, 46 and 47 are inputted to a left region about the start point of the line 20 in the touch input unit 2 or three points 48, 49 and 50 are inputted to a right region about the end point of the line 20.

In addition, FIG. 2(e) illustrates the case in which the line 20 is inputted to the touch input unit 2 in a drawing direction and the three points 45, 46 and 47 are inputted to the left region about the start point of the line 20 in the touch input unit 2 or the three points 48, 49 and 50 are inputted to the right region about the end point of the line 20, and then one point 43 is inputted to the left side of the drawing direction of the line 20 in the touch input unit 2 or the one point 44 is inputted to the right side of the drawing direction of the line 20 in the touch input unit 2.

In other words, FIG. 2(e) indicates that at least one point may be touched to the left region or the right region about the drawing direction of the line 20, and at least one point may be touched to the left region of the start point or the right region of the end point.

This may indicate that two outputs of the electronic device 10 may be adjusted simultaneously or sequentially. For example, it may indicate that the volume and the channel of the electronic device 10 may be adjusted.

According to one embodiment, when at least one point may be touched to the left region or the right region about the drawing direction of the line 20, the output adjustment unit 3 may increase or decrease the volume of the electronic device 10. In addition, when at least one point is touched to the left region of the start point of the line 20 or the right region of the end point of the line 20, the output adjustment unit 3 may change the channel of the electronic device 10 in the direction of increasing or decreasing a channel number.

In this case, when the one point 31 is touched to the left region about the drawing direction of the line 20 in FIG. 2(e), the output adjustment unit 3 may generate the adjustment information configured to increase a volume of the electronic device 10 by one step equivalent to the preset volume. In addition, when the one point 32 is touched to the right region about the drawing direction of the line 20, the output adjustment unit 3 may generate the adjustment information configured to decrease a volume of the electronic device 10 by one step equivalent to the preset volume.

Meanwhile, in FIG. 2(e), when the three points 45, 46 and 47 are touched to the left region of the start point of the line 20, the output adjustment unit 3 may generate adjustment information configured to change the channel of the electronic device 10 three times in a direction of decreasing the channel number. In addition, when the three points 48, 49 and 50 are touched to the right region of the end point of the line 20, the output adjustment unit 3 may generate adjustment information configured to change the channel of the electronic device 10 three times in a direction of increasing the channel number.

On the contrary when at least one point may be touched to the left region or the right region about the drawing direction of the line 20, the output adjustment unit 3 may change the channel of the electronic device 10 in the direction of increasing or decreasing a channel number. In addition, when at least one point is touched to the left region of the start point of the line 20 or the right region of the end point of the line 20, the output adjustment unit 3 may increase or decrease the volume of the electronic device 10.

In this case, in FIG. 2(e) when the one point 31 is touched to the left region about the drawing direction of the line 20, the output adjustment unit 3 may generate adjustment information configured to change the channel of the electronic device 10 one time in the direction of increasing the channel number. In addition, when the one point 32 is touched to the right region about the drawing direction of the line 20, the output adjustment unit 3 may generate adjustment information configured to change the channel of the electronic device 10 one time in the direction of decreasing the channel number.

Meanwhile, in FIG. 2(e) when the three points 45, 46 and 47 are touched to the left region of the start point of the line 20, the output adjustment unit 3 may generate the adjustment information configured to decrease a volume of the electronic device 10 by three steps equivalent to the preset volume. In addition, when the three points 48, 49 and 50 are touched to the right region of the end point of the line 20, the output adjustment unit 3 may generate the adjustment information configured to increase a volume of the electronic device 10 by three steps equivalent to the preset volume.

FIG. 2(f) illustrates a relative topology between the lime 20 and a point 51 touched at the start point of the line 20 or a point 52 touched at the end point of the line 20.

When the point 51 is touched at the start point of the line 20 after the line 20 is inputted in the above manner, the output adjustment unit 3 may control the electronic device 10 to be turned on by generating adjustment information configured to turn on the electronic device 10. Correspondingly, when the point 52 is touched at the end point of the line 20, the output adjustment unit 3 may control the electronic device 10 to be turned off by generating adjustment information configured to turn off the electronic device 10.

On the contrary, when the point 51 is touched at the start point of the line 20, the output adjustment unit 3 may control the electronic device 10 to be turned off by generating adjustment information configured to turn off the electronic device 10. Correspondingly, when the point 52 is touched at the end point of the line 20, the output adjustment unit 3 may control the electronic device 10 to be turned on by generating adjustment information configured to turn on the electronic device 10.

FIG. 3 is a view illustrating a relative topology between a line and a dragged line.

FIG. 3 shows a dragged line 70 dragged on the line 20 after the line 20 is inputted to the touch input unit 2.

In other words, the dragged line 70 has a relative topology with the line 20 in which the dragged line 70 is positioned on the line 20.

After the line 20 is inputted to the touch input unit 2, when the dragged line 70 on the line 20 is dragged in a direction opposite to a drawing direction of the line 20, the output adjustment unit 3 may generate adjustment information configured to decrease the volume of the electronic device 10 by the preset volume. Correspondingly, when the dragged line 70 on the line 20 is dragged in the drawing direction of the line 20 after the line 20 is inputted to the touch input unit 2, the output adjustment unit 3 may generate adjustment information configured to increase the volume of the electronic device 10 by the preset volume.

On the contrary, when the dragged line 70 on the line 20 is dragged in a direction opposite to a drawing direction of the line 20 after the line 20 is inputted to the touch input unit 2, the output adjustment unit 3 may generate adjustment information configured to increase the volume of the electronic device 10 by the preset volume. Correspondingly, when the dragged line 70 on the line 20 is dragged in the drawing direction of the line 20 after the line 20 is inputted to the touch input unit 2, the output adjustment unit 3 may generate adjustment information configured to decrease the volume of the electronic device 10 by the preset volume.

Although the dragged line 70 is illustrated as being dragged on line 20, it is not limited thereto. The dragged line 70 may be dragged to intersect the line 20. In other words, the dragged line 70 may intersect the line 70 perpendicularly or may be dragged while maintaining an angle of 45 degrees with respect to the line 70. This is merely an example and is not limited thereto. In addition, the dragged line 70 may be dragged in a region of the touch input unit 2 rather than a region on the line 70.

The above dragged line 70 refers to a line drawn in a state where a touch is continuously performed in the touch input unit 2.

FIG. 4 is a view illustrating a relative topology between at least one first figure and at least one second figure.

FIG. 4(*a*) is a view illustrating a relative topology in which the first figure is a quadrangle and the second figure is a point.

In other words, FIG. 4(*a*) is a view illustrating a relative topology of at least one point touched on over, below, left, and right regions of the quadrangle.

The output adjustment unit 3 may adjust at least one of the volume and the channel of the electronic device 10 depending on the relative topology of the at least one point touched on over, below, left, and right regions of the quadrangle.

More specifically, when the point is touched over the rectangle, the output adjustment unit 3 may generate adjustment information configured to increase the volume of the electronic device 10 by the preset volume. Since one point 101 is touched over the rectangle, the output adjustment unit 3 may generate adjustment information configured to increase the volume of the electronic device 10 by one step equivalent to the preset volume.

When the point is touched below the rectangle, the output adjustment unit 3 may generate adjustment information configured to decrease the volume of the electronic device 10 by the preset volume. Since two points 102 and 103 are touched below the rectangle, the output adjustment unit 3 may generate adjustment information configured to decrease the volume of the electronic device 10 by three steps equivalent to the preset volume.

When the point is touched at the left region from the rectangle, the output adjustment unit 3 may generate adjustment information configured to adjust the channel of the electronic device 10 in a direction of decreasing the channel number. Since three points 104, 105 and 106 are touched in the left region from the quadrangle, the output adjustment unit 3 may generate adjustment information configured to change the channel of the electronic device 10 three times in a direction of decreasing the channel number.

When the point is touched at the right region from the rectangle, the output adjustment unit 3 may generate adjustment information configured to adjust the channel of the electronic device 10 in a direction of increasing the channel number. Since one point 107 is touched at the right region of the quadrangle, the output adjustment unit 3 may generate adjustment information configured to change the channel of the electronic device 10 one time in the direction of increasing the channel number.

FIG. 4(*b*) is a view illustrating a relative topology between a first figure and a second figure in which the first figure is a quadrangle and the second figure is at least one line.

In other words, FIG. 4(*b*) is a view illustrating that at least one line is drawn in upward, downward, leftward, and rightward directions of the quadrangle from a center of the quadrangle.

The output adjustment unit 3 may adjust at least one of the volume and the channel of the electronic device 10 depending on the relative topology of the at least one line drawn in the upward, downward, leftward, and rightward directions of the quadrangle from the center of the quadrangle.

More specifically, when a line 120 is drawn upward from the center of the quadrangle, the output adjustment unit 3 may generate adjustment information configured to increase the volume of the electronic device 10 by a drawn length of the line 120.

When a line 121 is drawn downward from the center of the quadrangle, the output adjustment unit 3 may generate adjustment information configured to decrease the volume of the electronic device 10 by a drawn length of the line 121.

When a line 130 is drawn rightward from the center of the quadrangle, the output adjustment unit 3 may generate adjustment information configured to change the channel of the electronic device 10 continuously in the direction of increasing the channel number by a drawn length of the line 130.

When a line 131 is drawn leftward from the center of the quadrangle, the output adjustment unit 3 may generate adjustment information configured to change the channel of the electronic device 10 continuously in the direction of decreasing the channel number by a drawn length of the line 131.

FIG. 4(*c*) is a view illustrating a relative topology between a first figure and a second figure in which the first figure is a quadrangle and the second figure is at least one line.

In other words, FIG. 4(*c*) is a view illustrating that at least one line is drawn in upward, downward, leftward, and rightward directions of the quadrangle from the center of the quadrangle, in which the at least one line starts from an outside of the quadrangle.

The output adjustment unit 3 may adjust at least one of the volume and the channel of the electronic device 10 depending on a relative topology of the at least one line drawn in the upward, downward, leftward, and rightward directions from the upward, downward, leftward, and rightward outsides of the quadrangle.

More specifically, when a line 122 is drawn upward in the outer upper region of the rectangle, the output adjustment unit 3 may generate adjustment information configured to increase the volume of the electronic device 10 by a drawn length of the line 122.

When a line 123 is drawn downward in the outer lower region of the rectangle, the output adjustment unit 3 may generate adjustment information configured to decrease the volume of the electronic device 10 by a drawn length of the line 123.

When a line 132 is drawn rightward in the outer right region of the rectangle, the output adjustment unit 3 may generate adjustment information configured to change the channel of the electronic device 10 continuously in the direction of increasing the channel number by a drawn length of the line 132.

When a line 133 is drawn leftward in the outer left region of the rectangle, the output adjustment unit 3 may generate adjustment information configured to change the channel of the electronic device 10 continuously in the direction of decreasing the channel number by a drawn length of the line 133.

FIG. 4(d) a view illustrating a relative topology between two lines and at least one point in which the first figure is a line and the second figure is a point.

In other words, FIG. 4(d) is a view illustrating that two lines forms an 'X' shape and at least one point is touched to each region of the 'X'.

The output adjustment unit 3 may adjust at least one of the volume and the channel of the electronic device 10 depending on a relative topology of at least one point touched to four regions 180, 181, 182, and 183 of the 'X' defined by the two lines.

More specifically, when the point is touched to the region 180 defined by the 'X', the output adjustment unit 3 may generate adjustment information configured to increase the volume of the electronic device 10. Since one point 160 is touched in the region 180 defined by the 'X', the output adjustment unit 3 may generate adjustment information configured to increase the volume of the electronic device 10 by one step equivalent to the preset volume.

When the point is touched in the region 181 defined by the 'X', the output adjustment unit 3 may generate adjustment information configured to decrease the volume of the electronic device 10. Since two points 161 and 162 are touched in the region 181 defined by the 'X', the output adjustment unit 3 may generate adjustment information configured to decrease the volume of the electronic device 10 by two steps equivalent to the preset volume.

When the point is touched in the region 182 defined by the 'X', the output adjustment unit 3 may generate adjustment information configured to change the channel of the electronic device 10 in the direction of increasing the channel number. Since one point 170 is touched in the region 182 defined by the 'X', the output adjustment unit 3 may generate adjustment information configured to change the channel of the electronic device 10 one time in the direction of increasing the channel number.

When the point is touched in the region 183 defined by the 'X', the output adjustment unit 3 may generate adjustment information configured to change the channel of the electronic device 10 in the direction of decreasing the channel number. Since three points 171, 172 and 173 are touched in the region 183 defined by the 'X', the output adjustment unit 3 may generate adjustment information configured to change the channel of the electronic device 10 three times in a direction of decreasing the channel number.

Referring back to FIG. 1, the output adjustment unit 3 may generate at least one adjustment information when the at least one first figure and the at least one second figure have a same relative topology therebetween even if a position and a direction of a touch on the touch input unit 2 are different.

Figure 5:
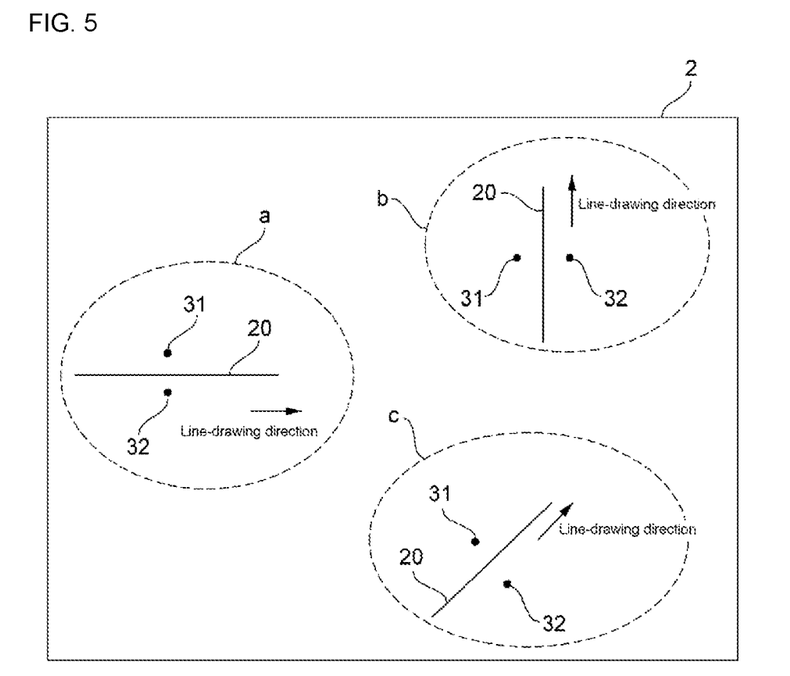
FIG. 5 is a view illustrating three examples in which a relative topology between a line and a point is the same even if a touch position and a direction are different on a touch input unit.

An example of the above case is shown in FIG. 5.

FIG. 5 illustrates that the line 20 and a point 31 or the point 32 are touched to have different touch positions and directions in three regions a, b and c on the touch input unit 2. At this time, the point 31 is positioned in a left region of the drawing direction of the line 20 with respect to the line 20, and the point 32 is positioned in a right region of the drawing direction of the line 20 with respect to the line 20.

Since the relative topology between the line 20 and the point 31 or point 32 is the same even if a position and a direction are different in three regions 80, 81 and 82 on the touch input unit 2, the output adjustment unit 3 may generate adjustment information configured to adjust an output of the electronic device 10.

Meanwhile, the output adjustment unit 3 may generate the at least one adjustment information by taking consideration an association attribute between the at least one first figure and the at least one second figure depending on the relative topology, and an intrinsic attribute of the at least one second figure, in addition to the relative topology.

The association attribute will be described with reference to FIG. 2 in the case that the first figure is a line and the second figure is a point.

In FIG. 2(a), the association attribute between the line 20 and the point 31 may be the ratio (L2/L1) of a distance L2 between the line 20 and the point 31 and a length L1 of the line 20.

In FIG. 2(b), the association attribute between the line 20 and the two points 33 and 34 touched at the same position on the line 20 may be the ratio (L3/L1 or L4/L1) between a spaced distance L3 between the start point of the line 20 and the same position or a spaced distance L4 between the end point of the line 20 and the same position, and the length L1 of the line 20.

In FIG. 2(c), the association attribute between the line 20 and the four points 35, 36, 37, and 38 touched at the different positions on the line 20 may be the ratio (L5/L1) between a spaced distance L5 between the start point of the line 20 and any one of the four points 35, 36, 37 and 38 (such as the point 35 closest to the start point of the line 20), and the length L1 of the line 20.

Although the point 35 closest to the start point of the line 20 is illustrated as an example among the four points 35, 36, 37, and 38, it is not limited thereto.

Meanwhile, the intrinsic attribute of the second figure may be a touch duration or touch area of the point when the second figure is a point.

The case of adjusting the output of the electronic device 10 will be described in consideration of at least one of the relative topology between the first figure and the second figure and the intrinsic attribute of the second figure.

To this end, in FIG. 2(f), When the point 51 is touched at the start point of the line 20 (in which the relative topology between the line 20 and the point 51 is taken into consideration) or the point 51 is touched at the start point of the line 20 for a predetermined time or more (in which not only the relative topology between the line 20 and the point 51 but also the intrinsic attribute of the point 51 are taken into consideration), the output adjustment unit 3 may control the electronic device 10 by generating adjustment information configured to turn on the power, turn on a screen, or unlock an application execution of the electronic device 10.

Correspondingly, in FIG. 2(f), when the point 52 is touched at the end point of the line 20 (in which the relative topology between the line 20 and the point 52 is taken into consideration) or the point 52 is touched at the end point of the line 20 for a predetermined time or more (in which not only the relative topology between the line 20 and the point 52 but also the intrinsic attribute of the point 52 are taken into consideration), the output adjustment unit 3 may control the electronic device 10 by generating adjustment information configured to turn off the power, turn off the screen, or unlock the application execution of the electronic device 10.

An opposite embodiment is also possible.

In other words, in FIG. 2(*f*), when the point 51 is touched at the start point of the line 20 (in which the relative topology between the line 20 and the point 51 is taken into consideration) or the point 51 is touched at the start point of the line 20 for a predetermined time or more (in which not only the relative topology between the line 20 and the point 51 but also the intrinsic attribute of the point 51 are taken into consideration), the output adjustment unit 3 may control the electronic device 10 by generating adjustment information configured to turn off the power, turn off the screen, or lock the application execution of the electronic device 10.

Correspondingly, in FIG. 2(*f*), when the point 52 is touched at the end point of the line 20 (in which the relative topology between the line 20 and the point 52 is taken into consideration) or the point 52 is touched at the end point of the line 20 for a predetermined time or more (in which not only the relative topology between the line 20 and the point 52 but also the intrinsic attribute of the point 52 are taken into consideration), the output adjustment unit 3 may control the electronic device 10 by generating adjustment information configured to turn on the power, turn on a screen, or unlock an application execution of the electronic device 10.

Referring back to FIG. 1, the figure of the first and second figures firstly inputted to the touch input unit 2 may be displayed on the touch input unit 2 such that the relative topology with the figure to be touched later become clear. A time when the figure of the first and second figures firstly inputted to the touch input unit 2 is displayed on the touch input unit 2 may be a time set to allow the remaining figure to be inputted to the touch input unit 2 later.

However, the figure of the first and second figures firstly inputted to the touch input unit 2 may not be displayed while the remaining figure being inputted on the touch input unit 2.

This is because the touch input of the second figure is performed in a very short time after the first figure is inputted, when the first figure is a line and the second figure is a point or a dragged line, which is the first figure, intersects the line or dragged in a region other than the line.

Referring back to FIG. 1, the touch input unit 2 may detect a touch input of a predictive figure that informs touch inputs of the at least one first figure and the at least one second figure in advance, before the touch input of the at least one first figure and the at least one second figure.

In this case, when the touch input of the predictive figure is detected from the touch input unit 2, the output adjustment unit 3 may generate at least one adjustment information for adjusting at least one output of the electronic device 10, depending on the relative topology of the at least one first figure and the at least one second figure that are touched later.

Accordingly, the reasons for detecting the touch inputs of the at least one first figure and the at least one second figure after the touch input of the predictive figure is detected are as follows: First, it is for the safe execution of the electronic device 10.

When the information is inputted through the touch input of the touch input unit 2, noises that are unwanted by the user may be inputted to the touch input unit 2. For example, a command for drawing a line and applying a point may be inputted to the touch input unit 2 without any intention of the user. For example, a smart phone in a pocket executes an intended program or makes an unwanted call. An erroneous input in control may be fatal. Accordingly, the reason for initially receiving the complicated predictive figure such as 'X' is intended to prevent the erroneous input.

Second, it is for encryption. The reason for initially receiving the predictive figure is to set an encryption pattern to prevent an external user from executing the electronic device 10.

Although the above description is illustrated as receiving the predictive figure, it is not limited thereto. A tap may be performed or a preset voice may be inputted to the touch input unit 2. The above predictive figure, tap, or preset voice may be collectively referred to as predictive information. The touch input unit 2 may be interworked with an external microphone or provided with a microphone therein to receive the preset voice or the like as the predictive information.

The predictive information may be inputted to prevent the erroneous input or implement the encryption function.

The configuration for the output adjustment apparatus of the electronic device using the touch technology depending on the embodiments of the present invention has been described.

According to the apparatus for adjusting outputs of the electronic device using the touch technology based on the embodiments of the present invention, the user can easily adjust the output of electronic device through the intuitive touch input.

The block diagram of the output adjustment apparatus 1 of the electronic device using the touch technology depending on the embodiment of the present invention shown in FIG. 1 is merely classified from a functional viewpoint, and does not signify actual implementation scheme or hardware scheme. It will be apparent to those skilled in the art that one or more component modules shown in FIG. 1 may be integrated or subdivided into one or more component modules.

Hereinafter, the method for adjusting outputs of the electronic device performed by the output adjustment apparatus 1 of the electronic device using the touch technology depending on the embodiments of the present invention will be described.

Figure 6:
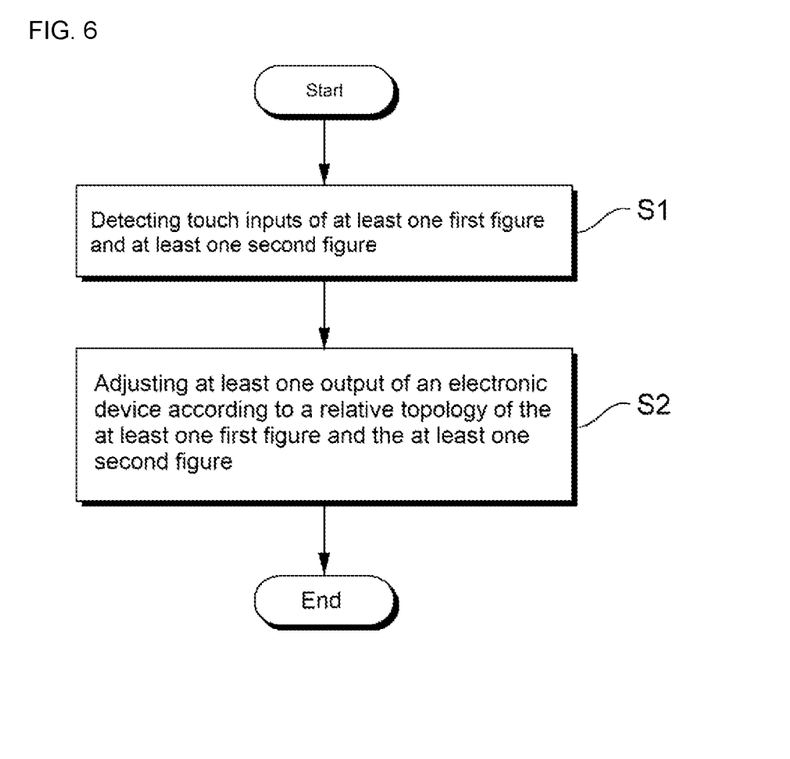
FIG. 6 is a flow chart of a method of adjusting an output of an electronic device using a touch technology depending on an embodiment of the present invention.

FIG. 6 is a flow chart of the method of adjusting outputs of the electronic device depending on one embodiment of the present invention.

Referring to FIG. 6, the touch input unit 2 detects touch inputs of the at least one first figure and the at least one second figure (S1).

The output adjusting unit 3 adjusts at least one output of the electronic device 10 by generating at least one adjustment information for adjusting at least one output of the electronic device 10 depending on a relative topology of the at least one first figure and the at least one second figure (S2).

When the at least one first figure and the at least one second figure have a same relative topology therebetween even if a position and a direction of a touch are different on the touch input unit 2, the output adjustment unit 3 may generate the at least one adjustment information.

Further, the output adjustment unit 3 may generate the at least one adjustment information by taking consideration at least one of an association attribute between the at least one first figure and the at least one second figure depending on the relative topology, and an intrinsic attribute of the at least one second figure, in addition to the relative topology.

According to the method for adjusting outputs of an electronic device using touch technology based on one embodiment of the present invention, the touch input unit 2 may detect an input of a predictive figure that informs touch inputs of the at least one first figure and the at least one second figure in advance for generating the at least one adjustment information, before the touch input of the at least one first figure and the at least one second figure.

Accordingly, in step S2 of adjusting the at least one output of the electronic device, the output adjustment unit 3 may generate at least one adjustment information for adjusting at least one output of the electronic device, depending on a relative topology between the at least one first figure and the at least one second figure touch-inputted from the touch input unit, after the touch input of the predictive figure is detected.

Figure 7:
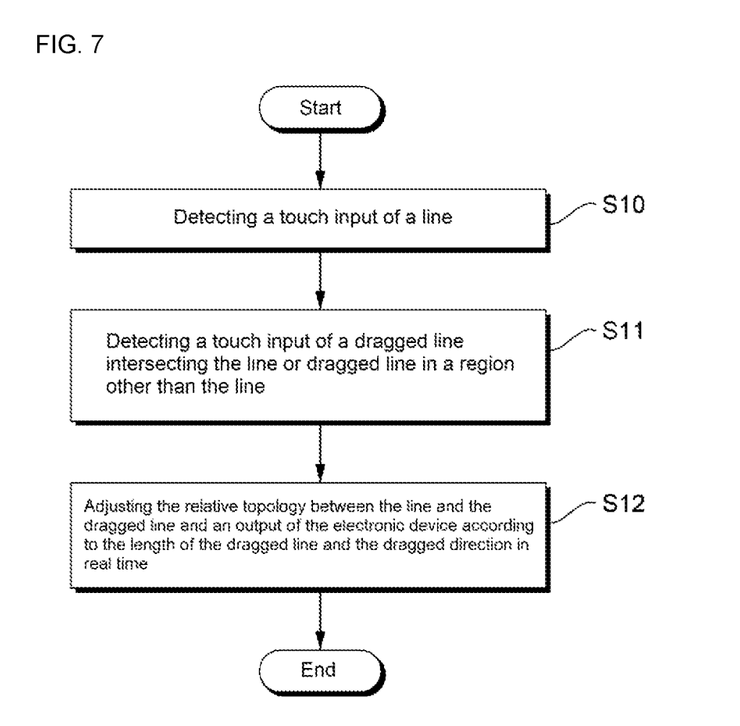
FIG. 7 is a flow chart of a method of adjusting an output of an electronic device using a touch technology depending on another embodiment of the present invention.

FIG. 7 is a flow chart of a method of adjusting an output of an electronic device using a touch technology depending on another embodiment of the present invention.

Referring to FIG. 7, the touch input unit 2 detects a touch input of a line (S10).

The touch input unit 2 detects a touch input of a dragged line intersecting the line on the line or dragged in a region other than the line (S11).

The output adjusting unit 3 adjusts the output of the electronic device in real time by generating adjustment information for adjusting the output of the electronic device 10, depending on a relative topology between the line and the dragged line, and a length of the dragged line and a dragged direction (S12).

At this time, the output adjustment unit 3 may generate the adjustment information when the relative topology between the line and the dragged line and the length of the dragged line and the dragged direction are the same even if a position and a direction of a touch are different on the touch input unit 2.

According to the method for adjusting outputs of an electronic device using a touch technology based on another embodiment of the present invention, the touch input unit 2 may detect a touch input of a predictive figure that informs touch inputs of a line and a dragged line in advance for generating the adjustment information, before the touch input of the line and the dragged line.

In this case, in step S12 of adjusting the output of the electronic device 10, the output adjustment unit 3 may generate adjustment information for adjusting the output of the electronic device 10 depending on the relative topology between the line and the dragged line touched from the touch input unit 2, and a length of the dragged line and a dragged direction, after the touch input of the predictive figure is detected.

Figure 8:
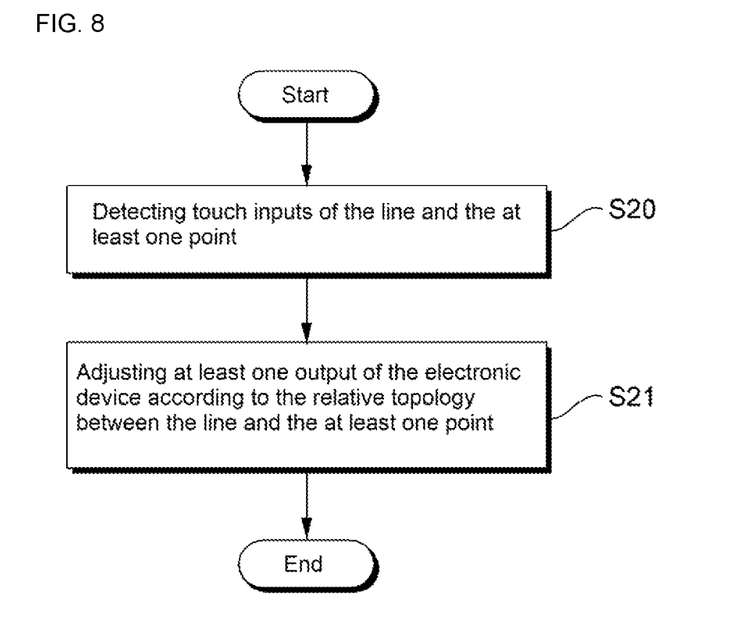
FIG. 8 is a flow chart of a method of adjusting an output of an electronic device using a touch technology depending on still another embodiment of the present invention.

FIG. 8 is a flow chart of a method of adjusting an output of an electronic device using a touch technology depending on still another embodiment of the present invention.

Referring to FIG. 8, the touch input unit 2 detects a touch input of a line and at least one point (S20).

The output adjusting unit 3 adjusts at least one output of the electronic device 10 by generating at least one adjustment information for adjusting at least one output of the electronic device 10, depending on the relative topology between the line and the at least one point (S21).

At this time, the output adjustment unit 3 may generate the at least one adjustment information when the relative topology between the line and the at least one point is the same even if a position and a direction of a touch are different on the touch input unit 2.

Further, the output adjustment unit 3 may generate the at least one adjustment information by taking consideration at least one of an associated attribute between the line and the at least one point depending on the relative topology, and an intrinsic attribute of the at least one point, in addition to the relative topology.

With regard to the relative topology, all of the at least one point are positioned at the same or different position on the line, or a part of the at least one point may be positioned at the same or different position on the line and the rest may be positioned at a position other than the line.

When the at least one point is positioned at the same position on the line, the association attribute may be the ratio between a spaced distance between the start point of the line and the same position or a spaced distance between the end point of the line and the same position and a length of the line.

When the at least one point is positioned at a different position on the line, the association attribute may be the ratio between a spaced distance between the start point of the line and any one of the at least one point positioned at the different positions or a spaced distance between the end point of the line and any one of the at least one point positioned at the different positions and a length of the line.

When the at least one point is positioned in a region of the touch input unit other than the line, the association attribute may be the ratio between a spaced distance between any one of the at least one point positioned in the region of the touch input unit other than the line and the line, and a length of the line.

The intrinsic attribute of the point may be a touch duration or touch area of the point.

According to the method for adjusting outputs of an electronic device using a touch technology based on still another embodiment of the present invention, the touch input unit may detect a touch input of a predictive figure that informs touch inputs of a line and at least one point in advance for generating the adjustment information, before the touch inputs of the line and the at least one point.

Accordingly, in step S21 of adjusting the output of the electronic device 10, the output adjustment unit 3 may generate at least one adjustment information for adjusting at least one output of the electronic device 10, depending on the relative topology between the line and the at least one point touch-inputted from the touch input unit, after the touch input of the predictive figure is detected.

The embodiments of the present invention have been described. It will be apparent that a person having ordinary skill in the art may carry out various deformations and modifications within the scope without departing from inherent features of the present invention. Therefore, the disclosed embodiments should not be considered for purposes of limitation but should be considered in descriptive sense. Therefore, the scope of the present invention should not be limited to the above-described embodiments and should be construed to include various embodiments within the scope of the claims and equivalents thereof.

INDUSTRIAL APPLICABILITY

The present invention may be applied to a field of adjusting an output of an electronic device using a touch technology.

The invention claimed is:

1. A method for adjusting an output of an electronic device using a touch technology, the method comprising:
   detecting touch inputs of at least one first figure and at least one second figure, in a touch input unit; and
   adjusting, in an output adjustment unit, at least one output of the electronic device by generating at least one adjustment information configured to adjust at least one output of the electronic device depending on a relative topology between the at least one first figure and the at least one second figure,
   wherein the output adjustment unit generates the at least one adjustment information when the at least one first figure and the at least one second figure have a same relative topology therebetween even if a touch position and a touch direction on the touch input unit are different.

2. The method of claim 1, wherein the output adjustment unit generates the at least one adjustment information by taking into consideration at least one of an association attribute between the at least one first figure and the at least one second figure depending on the relative topology, and an intrinsic attribute of the at least one second figure, in addition to the relative topology.

3. The method of claim 1, further comprising:
   detecting an input of predictive information that informs touch inputs of at least one first figure and at least one second figure in advance for generating the at least one adjustment information in the touch input unit, before the touch inputs of the at least one first figure and the at least one second figure, wherein, in the adjusting of the at least one output of the electronic device, the output adjustment unit generates at least one adjustment information configured to adjust at least one output of the electronic device depending on a relative topology between the at least one first figure and the at least one second figure touch-inputted from the touch input unit after the input of the predictive information is detected.

4. A method for adjusting an output of an electronic device using a touch technology, the method comprising:
   detecting a touch input of a line by the touch input unit;
   detecting, by the touch input unit, a touch input of a dragged line intersecting the line on the line or dragged in a region other than the line; and
   adjusting, by an output adjustment unit, the output of the electronic device in real time by generating adjustment information for adjusting the output of the electronic device depending on a relative topology between the line and the dragged line, and a length of the dragged line and a dragged direction,
   wherein the output adjustment unit generates the adjustment information when the relative topology between the line and the dragged line and the length of the dragged line and the dragged direction are identical even if a touch position and a touch direction on the touch input unit are different.

5. The method of claim 4, further comprising:
   detecting, by the touch input unit, an input of predictive information that informs touch inputs of a line and a dragged line in advance for generating the adjustment information, before the touch input of the line and the dragged line,
   wherein, in the adjusting of the output of the electronic device, the output adjustment unit generates adjustment information for adjusting the output of the electronic device depending on the relative topology between the line and the dragged line touch-inputted from the touch input unit, and a length of the dragged line and a dragged direction, after the input of the predictive information is detected.

6. A method for adjusting an output of an electronic device using a touch technology, the method comprising:
   detecting touch inputs of a line and at least one point in the touch input unit; and
   adjusting, in an output adjustment unit, at least one output of the electronic device by generating at least one adjustment information configured to adjust at least one output of the electronic device depending on the relative topology between the line and the at least one point,
   wherein the output adjustment unit generates at least one adjustment information when the relative topology between the line and the at least one point is identical even if a touch position and a touch direction on the touch input unit are different.

7. The method of claim 6, wherein the output adjustment unit generates at least one adjustment information by taking into consideration at least one of an associated attribute between the line and the at least one point depending on the relative topology and an intrinsic attribute of the at least one point into consideration, in addition to the relative topology.

8. The method of claim 7, wherein the relative topology is configured such that all of the at least one point are positioned at an identical or different position on the line, or a part of the at least one point is positioned at an identical or different position on the line and a remaining is positioned at a position other than the line.

9. The method of claim 8, wherein, when the at least one point is positioned at the identical position on the line, the association attribute includes a ratio between a length of the line and a spaced distance between the start point of the line and the identical position or a ratio between the length of the line and a spaced distance between the end point of the line and the identical position.

10. The method of claim 8, wherein, when the at least one point is positioned at the different position on the line, the association attribute includes a ratio between a length of the line and a spaced distance between the start point of the line and any one of the at least one point positioned at the different positions or a ratio between the length of the line and a spaced distance between the end point of the line and any one of the at least one point positioned at the different positions.

11. The method of claim 8, wherein, when the at least one point is positioned in a region of the touch input unit other than the line, the association attribute includes a ratio between a spaced distance between any one of the at least one point positioned in the region of the touch input unit other than the line and the line, and a length of the line.

12. The method of claim 8, wherein the intrinsic attribute of the point includes a touch duration or touch area of the point.

13. The method of claim 6, further comprising:
    detecting, by the touch input unit, an input of predictive information that informs touch inputs of a line and at least one point in advance for generating the adjustment information, before the touch inputs of the line and the at least one point,
    wherein, in the adjusting of the output of the electronic device, the output adjustment unit generates at least one adjustment information configured to adjust at least one output of the electronic device depending on the relative topology between the line and the at least one point touch-inputted from the touch input unit, after the input of the predictive information is detected.

14. An apparatus of adjusting an output of an electronic device using a touch technology, the apparatus comprising:
a touch input unit configured to detect touch inputs of a first figure and at least one second figure; and
an output adjustment unit configured to adjust at least one output of the electronic device by generating at least one adjustment information configured to adjust at least one output of the electronic device depending on a relative topology between the at least one first figure and the at least one second figure,
wherein the output adjustment unit generates at least one adjustment information when the first figure and the at least one second figure have a same relative topology therebetween even if a touch position and a touch direction on the touch input unit are different.

15. The apparatus of claim 14, wherein the output adjustment unit generates the at least one adjustment information by taking into consideration at least one of an association attribute between the first figure and the at least one second figure depending on the relative topology and an intrinsic attribute of the at least one second figure into consideration, in addition to the relative topology.

16. The apparatus of claim 14, wherein the touch input unit detects an input of predictive information that informs touch inputs of a first figure and at least one second figure in advance for generating the at least one adjustment information in the touch input unit, before the touch input of the first figure and the at least one second figure,
and wherein the output adjustment unit generates at least one adjustment information configured to adjust at least one output of the electronic device depending on a relative topology between the first figure and the at least one second figure touch-inputted from the touch input unit, after the input of the predictive information is detected.

* * * * *